| United States Patent [19] | [11] Patent Number: 4,877,682 |
|---|---|
| Sauers et al. | [45] Date of Patent: Oct. 31, 1989 |

[54] LAMINATES CONTAINING COEXTRUDED SCRAP

[75] Inventors: Marvin E. Sauers, Belle Mead; Tyler F. Hartsing, Jr., Westfield, both of N.J.; Lee P. McMaster, Fairfield, Conn.

[73] Assignee: Amoco Corporation, Chicago, Ill.

[21] Appl. No.: 160,458

[22] Filed: Feb. 24, 1988

Related U.S. Application Data

[63] Continuation of Ser. No. 843,297, Mar. 24, 1986, abandoned.

[51] Int. Cl.$^4$ ............... B65D 23/00; B32D 27/36
[52] U.S. Cl. ................... 428/412; 428/419; 428/473.5; 428/474.9; 428/515; 428/475.8; 428/903.3; 428/35.7
[58] Field of Search ............ 428/35, 412, 419, 473.5, 428/474.9, 475.8, 515, 903.3; 521/40; 156/244.11; 264/171, DIG. 69, 37

[56] References Cited

U.S. PATENT DOCUMENTS

| | | | |
|---|---|---|---|
| 3,723,582 | 3/1973 | Winstead | 264/37 |
| 3,977,153 | 8/1976 | Schrenk | 264/515 |
| 3,997,677 | 12/1976 | Hirsch et al. | 428/412 |
| 4,234,663 | 11/1980 | Catte et al. | 428/327 |
| 4,287,147 | 9/1981 | Hungerford | 264/171 |
| 4,359,506 | 11/1982 | Wiggins et al. | 428/419 |
| 4,402,889 | 9/1983 | Bonis | 264/DIG. 69 |
| 4,410,602 | 10/1985 | Komoda et al. | 428/2 |
| 4,576,842 | 3/1986 | Hartsing et al. | 428/35 |
| 4,647,509 | 3/1987 | Wallace et al. | 428/475.8 |
| 4,652,325 | 3/1987 | Benge et al. | 428/35 |

FOREIGN PATENT DOCUMENTS 996018  8/1976  Canada ........................ 428/35

*Primary Examiner*—Nancy A. B. Swisher
*Attorney, Agent, or Firm*—Donald M. Papuga; William H. Magidson; Ralph C. Medhurst

[57] ABSTRACT

A continuous plastic laminate having improved stiffness at use temperature, comprising at least three melt coextruded sheets, each comprising a thermoplastic polymer or polymer blend, the outside sheets having a higher stiffness at use temperature than at least one inside sheet,
wherein said continuous laminate scrap derived from the production of said laminate, said scrap being incorporated therein by melt coextruding said scrap as at least one additional discrete inside layer or by melt coextruding said scrap as part of at least one of said melt coextruded sheets,
whereby the stiffness at use temperature of said scrap-containing laminate is increased relative to a plastic laminate identical thereto except for the incorporation of said scrap, and
wherein said thermoplastic polymer or polymer blend comprises a polyarylethersulfone, a poly(aryl ether), a polyarylate, a polyetherimide, a polyester, an aromatic polycarbonate, a styrene resin, a poly(alkyl), a polyhydroxyether, a polyamide, a poly(arylene sulfide), a crystalline polyolefin, a polyphenylene oxide, or blends thereof.

39 Claims, No Drawings

LAMINATES CONTAINING COEXTRUDED SCRAP

This is a continuation of application Ser. No. 843,297, filed Mar. 24, 1986, now abandoned.

FIELD OF THE INVENTION

This invention relates to a laminate containing scrap which is generated during the laminate's production and which improves the laminate's stiffness at high use temperatures. The invention further relates to articles of manufacture, particularly cookware, fabricated from the improved, scrap-containing laminate.

BACKGROUND OF THE INVENTION

Laminates comprising adherent layers of polymeric materials, both filled and unfilled, have been used in diverse applications ranging from electrical insulators to bullet proof shields in banks. In particular, laminates formed by a melt coextrusion process enjoy widespread use as films and containers.

Melt coextrusion is a well known and amply documented technique, see for example *Plastic Engineering Handbook*, edited by Joel Frados, Van Nostrand Reinhold, fourth edition, pages 197–199. Also see U.S. Pat. Nos. 4,404,547 and 4,336,012 to Koch et al., and 4,403,934 and 4,420,451 to Rasmussen et al., among others. The technique can be used to join plies or layers of different polymers exhibiting different and advantageous properties. Thus laminates having polymer layers which differ as to, for example, melting point (if the layer materials are crystalline), glass transition temperature ($T_g$), oxygen permeability, impact resistance, flexural modulus, and so forth can be relatively easily fabricated.

In particular, laminates having three or more sheets have been developed wherein the outside sheets have a higher or lower use temperature than an inside sheet. Copending application Ser. No. 710,126 filed Mar. 11, 1985, commonly assigned, discloses cookware made from a laminate comprising at least three sheets made from a thermoplastic resin, an inside sheet made from a thermoplastic resin having a lower use temperature than the thermoplastic resin the outside sheets are made from. Copending U.S. patent application Ser. No. 590,791 filed Mar. 19, 1984, commonly assigned, discloses cookware made from a laminate comprising at least three sheets made from a thermoplastic resin, an inside sheet made from a thermoplastic resin having a higher use temperature than the thermoplastic resin the two outside sheets are made of.

In laminates such as those disclosed in the above copending applications the thermoplastic polymers used to make the individual sheets are generally chosen to provide a laminate which can withstand cooking temperatures while also providing good economics. For this use, achieving a sufficiently high stiffness at cooking temperatures to retain dimensional stability while filled with food is a necessary criterion for acceptable performance. Employing only a high use temperature thermoplastic polymer having a $T_g$ on the order of 350°–450° F. to wholly fabricate an article of cookware would, of course, provide useful cookware, but at a prohibitive cost. A cheaper, lower $T_g$ polymer may be used to wholly fabricate such articles, but at considerable loss in stiffness at high use temperatures, even though the polymer may retain some stiffness if it is crystalline. Such articles generally do not retain sufficient dimensional stability under load bearing conditions, however, such a when a heated container is filled with food. Thus a solution is to use a lower $T_g$ material as a "filler" sheet in a laminate which also comprises high $T_g$ sheets for their stiffening capability under load at high cooking temperatures. Thus, useful items capable of withstanding cooking temperatures can be made by laminating a lower $T_g$ polymer which retains some stiffness at cooking temperatures, such as polyethylene terephthalate, with outside layers of a high $T_g$ polymer which retains good stiffness at cooking temperatures, such as polyarylethersulfone.

When making useful articles from such laminates a significant amount of laminate tends to be wasted in the form of laminate scrap which is trimmed from the articles, for example following thermoforming operations. As a reasonably accurate rule of thumb the cost of a polymer tends to increase with the polymer's glass transition temperature ($T_g$). Thus the generation of laminate scrap can be costly if the scrap contains high $T_g$ sheets and is discarded.

A few attempts have been made to reclaim scrap and fabricate useful articles therefrom. British Pat. No. 1,552,234 discloses building or insulating material fabricated by uniting, with heat in an existing layer, granulated plastic of a particular particle size and then sintering and compressing the existing layer with at least one further layer material having a smaller particle size, such that a sharp boundary between the layers is not formed. U.S. Pat. No. 4,402,889 to Bonis discloses making a sheet with moisture barrier properties by coextruding outer layers of so-called qualified scrap (i.e., virgin plastic or scrap of one type of plastic only) together with a central layer of so-called unqualified scrap (i.e., unspecified, but having certain compositional limitations) having high enough polyolefin content to provide a moisture barrier.

However, if layers of different polymers in a laminate are melt incompatible, that is if the layers are substantially melt immiscible, tending to exist as separate melt phase, then simply grinding the scrap and attempting to melt process it into useful unitary composite articles generally results in articles of poor quality. Such articles are often brittle, exhibit relatively low impact resistance, and have low binding integrity. Terms in the art such as "cheesy" and "splitty", denoting a propensity to flake apart under relatively mild load or stress conditions, are frequently applied to such articles.

The bulk of the prior art otherwise involves using scrap simply as an economic expedient, either to avoid having to discard scrap altogether or to furnish a cheap source of useable materials in place of virgin plastic. The following are exemplary.

U.S. Pat. No. 4,045,603 to Smith discloses using (unspecified) waste shredded thermoplastic synthetic resin material bits and waste shredded cellulose fiber material bits as low-cost sources from which to fabricate construction materials.

U.S. Pat. No. 4,287,147 to Hungerford discloses a method for utilizing selvage or scrap from polyacrylonitrile film manufacturing operations to form a nonhomogeneous material for re-extrusion as a discrete layer in multi-layer film.

U.S. Pat. No. 4,234,663 to Catte et al. discloses incorporating, with the aid of a supplementary adhesive graft copolymer layer, scrap into a multi-layer foil comprising a styrenic polymer layer and an olefinic polymer layer, the scrap being obtained during the manufacture of the multi-layer foil.

U.S. Pat. Nos. 4,476,080 and 4,410,602 to Komoda et al. disclose a process and apparatus for forming films or sheet-like products from thermoplastic resin compositions using conventional extruders even when the resin compositions include reclaimed synthetic resins having relatively low thermal decomposition temperatures.

No prior art of which the inventors are aware, however, discloses using scrap laminate to actually improve the laminate from which it was generated by increasing the laminate's stiffness at use temperature.

SUMMARY OF THE INVENTION

The present invention provides a continuous plastic laminate comprising at least three melt coextruded sheets, each comprising a thermoplastic polymer or polymer blend, the outside sheets having a higher stiffness at use temperature than at least one inside sheet, wherein said continuous laminate contains laminate scrap derived from the production of said laminate, said scrap being incorporated therein by melt coextruding said scrap as at least one additional discrete inside layer or by melt coextruding said scrap as part of at least one of said melt coextruded sheets, whereby the stiffness at use temperature of said scrap-containing laminate is increased relative to a plastic laminate identical thereto except for the incorporation of said scrap, and wherein said thermoplastic polymer or polymer blend comprises a polyarylethersulfone, a poly(aryl ether), a polyarylate, a polyetherimide, a polyester, an aromatic polycarbonate, a styrene resin, a poly(alkyl acrylate), a polyhydroxyether, a polyamide, a poly(arylene sulfide), a crystalline polyolefin, a polyphenylene oxide, or blends thereof.

"Laminate scrap" denotes the mutlilayered selvage, trimmings, cutting, discards and so forth produced as the byproduct removed from articles fabricate from a thermoformable laminate.

"Use temperature" refers to a temperature above room temperature imparted to a laminate through using the laminate in a hot environment (such as a household range oven) or through using the laminate in contact with a heated material (such as hot food), as more fully discussed infra.

"Stiffness at use temperature" refers to a laminate's ability to resist deformation or deflection at the use temperature employed and depends on the applied load, the laminate's flexural modulus, and the laminate's thickness. In general, stiffness is proportional to the product of the laminate's modulus and the cube of its thickness. Well defined ASTM methods for measuring modulus are known.

The invention suprisingly provides an improved laminate by virtue of reinserting scrap back into a thermoplastic, thermoformable laminate from which it was generated. Importantly, for purposes of this invention, a polymer or polymer blend used as a laminate sheet material which has a high $T_g$ will, correspondingly, also have high stiffness at use temperature, and vice-versa. The same correlation also holds for lower $T_g$ materials which will exhibit lower stiffness at use temperature.

That scrap may be usefully reinserted into a laminate and actually improve the laminate is surprising since scrap alone is often not useful save for making articles having very low binding integrity and which are inferior to articles made from the laminate from which the scrap was generated. Thus scrap from a laminate which would otherwise be discarded may be employed in this invention to increase the stiffness at use temperature of that laminate. Prior to incorporating scrap into the laminate the scrap may be treated as by grinding or comminuting it to a desired particle size.

In a preferred embodiment scrap is incorporated into a laminate as at least one additional discrete inside sheet, preferably contiguous with one of the two (high $T_g$) outside sheets. It is most preferred in this embodiment to melt coextrude the scrap as two additional discrete inside sheets, each sheet being contiguous with an outside sheet.

The scrap may also be coextruded as part of at least one of the melt coextruded sheets, either as part of one or both of the outside sheets, as part of one or more inside sheets, or as part of the outside sheets and inside sheets.

In a further preferred embodiment, scrap which is incorporated into a laminate replaces a substantially equal volume of material from a low $T_g$ polymer inside sheet, preferably the sheet having the lowest $T_g$ polymer used to make the laminate.

As an example of the present invention, scrap having a three layer ABA configuration (i.e., two outside sheets or layers of a high $T_g$ polymer material "A" sandwiching a third intermediate low $T_g$ sheet of a polymer material "B") can be incorporated, for example, into one or more layers of an ABA laminate during the melt extrusion of the laminate.

In a further preferred embodiment the laminate and scrap are comprised of polymer layers which are melt incompatible. Examples of such laminates can be found in the aforementioned U.S. Ser. Nos. 590,791 and 710,126, filed in the name of T. F. Hartsing, both assigned to the present assignee. The entire disclosure of both applications is herein incorporated by reference. It is noted, of course, that when two immiscible polymers are blended together to form a laminate layer in the original construction before the incorporation of scrap the resulting blend can exhibit two different $T_g$'s. Scrap generated from the resulting blend may have greater utility depending on whether it is reinserted into the inside or outside layers of the laminate from which it was generated, and this in turn depends on the particular combination of polymers in the scrap.

An example of this preferred embodiment using the ABA laminate referred to above can schematically be set forth as follows, wherein the outside sheets are made from a high $T_g$ polymer A which is melt incompatible with a lower $T_g$ polymer B, the inside sheet, and wherein each A has a predetermined thickness of 0.003 inches (i.e., 3 mils) and B has a predetermined thickness of 14 mils, for a total predetermined laminate thickness of 20 mils. This laminate is abbreviated herein as 3A/14B/3A, each number representing a thickness in mils for a particular layer denominated by the letter to its right. The slashes, of course, denote layer interfaces. Similar notation is also used in layer interfaces. Like notation is also used in subsequent examples. The stiffness at use temperature of 3A/14B/3A laminate can be increased by incorporating 3A/14B/3A scrap (e.g., from a previous coextrusion of 3A/14B/3A) into, for example, the low $T_g$ B layer (e.g., during a subsequent run), increasing the B die opening to accommodate the volume of scrap added. In this case the laminate increases in thickness in proportion to the volume % of scrap added to the laminate. Thus if it is desired to add 30 volume % (based on the total volume of all materials used to make 3A/14B/3A) of scrap to the low $T_g$ B layer in 3A/14B/3A, the thickness of the B die opening should be increased in an amount equal to 0.30×20 mils, or 6 mils, for a total B thickness of 20 mils in the scrap-containing laminate which results.

Alternatively, the scrap may be distributed between the high $T_g$ outside A sheets and melt coextruded therewith. In a preferred embodiment, for this example, the scrap is divided into equal portions and each portion is melt coextruded as part of an outside sheet A. If a scrap volume of 30 vol. % is employed as above, a total of 6 mils is added to the laminate to accommodate the scrap volume, 3 mils per each outside sheet A. The resulting laminate has three sheets.

Alternatively, the scrap may be melt coextruded as one or more additional inside sheets. In a preferred embodiment for this example, using 30% scrap as above, the scrap is divided into two equal portions and each is melt coextruded as a discrete layer 3 mils thick, each discrete layer being contiguous with one of the two outside A layers. The result is a five layer laminate, two of the layers being scrap. Using the notation introduced above, this laminate would be denominated as 3A/3 scrap/14B/3 scrap/3A. The total thickness is 26 mils, 30 volume % (equivalent to 6 mils in thickness) of which is scrap.

If it is desired to maintain the thickness of the laminate constant at 20 mils then the scrap may be added as a replacement for a substantially equivalent volume of low $T_g$ polymer B. The scrap may, for example, be comingled directly with B and melt coextruded therewith, resulting in a three sheet laminate wherein th inside layer is still 14 mils, a 6 mil equivalent of pure B having been replaced by 6 mils of scrap. In a preferred embodiment, however, the scrap is melt coextruded as two discrete 3 mil sheets each contiguous with an outside A sheet, and an amount of B equivalent to 6 mils is removed from the B sheet. The resulting laminate is 20 mils thick, thus maintaining the overall thickness of the laminate. The laminate has 5 sheets, however, and may be described as 3A/3 scrap/8B/3 scrap/3A.

The result of this preferred embodiment is to make an improved laminate having at constant thickness increased stiffness at use temperature without having to do anything more than coextrude scrap. The scrap added to the laminate contains high $T_g$, high flexural modulus polymer A, while the equivalent volume of B removed by reducing the thickness of the B layer contains only low $T_g$, low flexural modulus polymer B. Thus the scrap-containing laminate contains more high $T_g$ polymer A than the original laminate 3A/14B/3A, and the stiffness of the laminate is accordingly increased. Although materials cost savings can be substantial, deriving not only from using waste scrap, but also by reducing the amount of fresh B needed to extrude the low $T_g$ layer in the scrap-containing laminate, the advantages provided by this invention are, most importantly, to make a better (i.e. stiffer at use temperature) product in addition to the substantial economic gains.

The upper limit of scrap which can be incorporated into a laminate is about 50 wgt. %, preferably about 30 wgt. %, based on the weight of the laminate. If overall laminate thickness is to be held constant by removing a volume of low $T_g$ material to compensate for the added volume of scrap, it is preferred to remove no more than about 75 wg. % of low $T_g$ material from any one low $T_g$ layer.

In this invention it is preferred to employ laminates having a use temperature of at least about 350° to about 450° F., most preferably between about 375° and about 425° F.

Although laminates fabricated with three sheets and two different polymer sheet materials have been exemplified, the invention is applicable to laminates fabricated with any greater number of different sheets and sheet materials. Scrap is incorporated into a layer of laminate during the melt extrusion thereof and, optionally, an equivalent volume % of one or more low $T_g$ layer materials is removed. Thus laminate scrap having an ABC configuration may be incorporated into a freshly extruded ABC laminate wherein A and C have higher $T_g$'s than inside sheet B. The scrap may be incorporated as one or more discrete inside sheets or may be melt coextruded as part of A, B, C or a combination thereof. If it is desired to maintain the thickness of the laminate constant, a volume % of B should be replaced equivalent to the volume % of scrap added.

DETAILED DISCUSSION

The types of materials which have been used to make laminates vary widely and all are considered to be within the scope of the invention, subject only to the requirements set forth in the appended claims. Laminates containing at least three melt coextruded layers may contain at least two from among any of the following exemplary layer materials:
polyarylethersulfones
poly(aryl ethers)
polyarylates
polyetherimides
polyesters
aromatic polycarbonates, including polyestercarbonates and polyaromatic sulfone carbonates
styrene resins
poly(allyl acrylates)
polyhydroxyethers
polyamides
poly(arylene sulfides)
polyolefins
polyphenylene oxides Laminates which are particularly contemplated for use in this invention include the following:
polyarylether sulfone/polycarbonate/polyarylether sulfone
polyarylether sulfone/polyarylate/polyarylether sulfone
polyarylether sulfone/polyethylene terephthalate/polyarylether sulfone
polyarylether sulfone/polybutylene terephthalate/polyarylether sulfone
polyarylether sulfone/polyamide/polyarylether sulfone
polyarylether sulfone/poly(arylene)sulfide/polyarylether sulfone
polyarylether sulfone/polypropylene/polyarylether sulfone
polyetherimide/polycarbonate/polyetherimide
polyetherimide/polyethylene terephthalate/polyetherimide
polyetherimide/polyarylate/polyetherimide
polyetherimide/polyamide/polyetherimide
polyetherimide/poly(arylene)sulfide/polyetherimide
polyetherimide/polypropylene/polyetherimide polyetherimide/polybutylene terephthalate/polyetherimide Although the laminates named above include three layers, laminates including additional alternating layers of the same polymeric materials shown in each laminate are also particularly contemplated.

The laminates encompassed by this invention have particular utility in applications where dimensional stability in high use temperature environments is an important feature, for example in applications of thermoformed laminates used as articles of dual oven cookware, as containers for hot food, ior as sterilization receptacles for medical instruments.

The invention is contemplated to have applicability particularly in the area of dual oven cookware, i.e., cookware which can be heated in conventional thermally heated range ovens and in microwave ovens. Such cookware includes disposable ovenable containers of the type used to heat frozen food ("TV") dinners as well as reusable cookware containers.

"Use temperature", as previously noted, refers to a temperature above room temperature which is imparted to a laminate, say through being contacted with a hot environments such as the heated air in a conventional household range oven or through being contacted with hot food (or other objects such as a medical instrument) which has been microwaved, steamed, or otherwise heated. At such temperatures a laminate layer fabricated from low $T_g$ polymer which has relatively low stiffness at use temperature may soften or otherwise impart little stiffness and strength to the laminate. Hence the laminate layers which maintain high stiffness at use temperatures are primarily responsible for maintaining the rigidity and dimensional stability of a laminate formed, for example, into a hot food container. One approach to improving the use temperature stiffness of a laminate, of course, is simply to build more virgin high $T_g$ polymer into the original laminate. This, however, can be cost prohibitive since high $T_g$ virgin material is expensive and simply increases manufacturing costs. The present invention can accomplish the same end, i.e., making a better, higher stiffness laminate which actually costs less than the original laminate because of the utilization of scrap.

THE THERMOPLASTIC POLYMERS

A. Polyarylethersulfones

The polyarylethersulfones (a special class of poly(aryl ethers)) useful in this invention are amorphous thermoplastic polymers containing units of the formula:

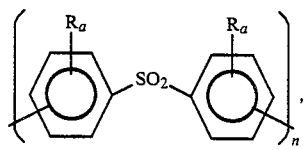
(I)

and

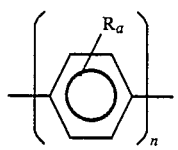

and/or

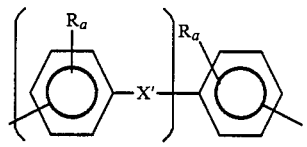
(III)

wherein R is independently hydrogen, $C_1$ to $C_6$ alkyl or $C_4$ to $C_8$ cycloalkyl, X' is independently

wherein $R_1$ and $R_2$ are independently hydrogen or $C_1$ to $C_9$ alkyl, or

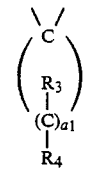

wherein $R_3$ and $R_4$ are independently hydrogen or $C_1$ to $C_8$ alkyl, and $a_1$ is an integer of 3 to 8; —S—, —O—, or

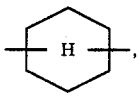

a is an integer of 0 to 4 and n is independently an integer of 1 to 3 and wherein the ratio of unit (I) to the sum of units (II) and/or (III) is greater than 1. The units are attached to each other by an —O— bond.

In preferred embodiments unit (I) has the formula

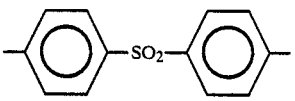

unit II has the formula

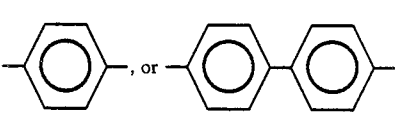

and unit III has the formula

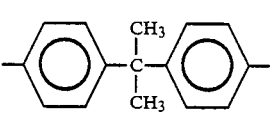

A preferred polymer of this invention contains units of the formula:

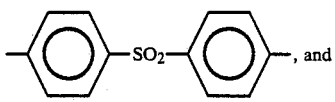

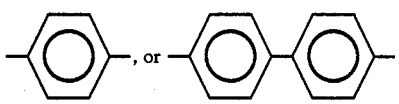

Another preferred polyarylethersulfone of this invention contains units of the formula:

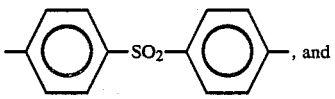

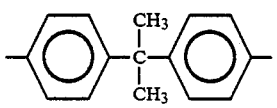

These units are attached to each other by an —O— bond.

The polyarylethersulfone may be random or may have an ordered structure.

The polyarylethersulfones of this invention have a reduced viscosity of from about 0.4 to greater than about 2.5, as measured in N-methylpyrolidone, or other suitable solvent, at 25° C.

The polyarylethersulfones of this invention are prepared by reacting the monomers represented by the following formulae:

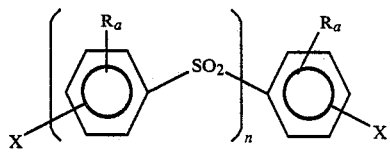

(IV)

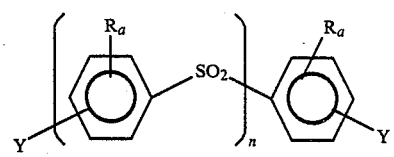

(V)

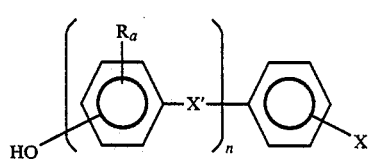

(VI)

and/or

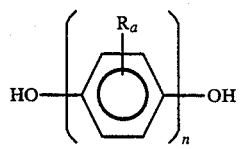

(VII)

wherein R, a, X' and n are as previously defined, and X and Y are independently selected from Cl, Br, F, NO$_2$ or OH and at least 50 percent of the Y's are OH.

The ratio of the concentration of OH groups to Cl, Br, F and/or NO$_2$ groups used to form the polyarylethersulfone is from about 0.90 to about 1.10, preferably from about 0.98 to about 1.02.

The monomers, represented by formulas (IV), (V), (VI) and (VII), include the following:
2,2-bis(4-hydroxyphenyl)propane,
2,2-bis(3,5-dimethyl-4-hydroxyphenyl)propane
bis(4-hydroxyphenyl)methane,
4,4'-dihydroxydiphenyl sulfide,
bis-(3,5-dimethyl-4-hydroxyphenyl)sulfone
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone,
4,4'-biphenol, hydroquinone, and the like.

The preferred monomers include hydroquinone, 4,4-biphenol, 2,2-bis(4-hydroxyphenyl)propane (Bisphenol A), 2,2-bis(3,5-dimethyl-4-hydroxyphenyl)propane (TMBA), bis-(3,5-dimethyl-4-hydroxyphenyl)sulfone (TMBS), 4,4'-dichlorodiphenyl sulfone, and 4,4'-dihydroxydiphenyl sulfone or 4 chloro-4'-hydroxydiphenyl sulfone.

The polymers of this invention are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at from about 120° to about 180° C., for about 1 to about 5 hours and then raised and kept at from about 200° to about 250° C., preferably from about 210° to about 230° C., for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

$$R_5\text{—S(O)}_b\text{—}R_5$$

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

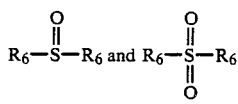

where the $R_6$ groups are independently lower alkyl, such as methyl, ethyl, propyl, butyl, and like groups, and aryl groups such as phenyl and alkylphenyl groups such as the tolyl group, as well as those where the $R_6$ groups are interconnected as in a divalent alkylene bridge such as:

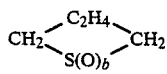

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide and N-methylpyrolidone.

The azeotrope forming solvent and polar aprotic solvent are used in a weight ratio of from about 10:1 to about 1:1, preferably from about 7:1 to about 5:1.

In the reaction, the hydroxy containing compound is slowly converted, in situ, to the alkali salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

B. Polyarylether resin

The poly(aryl ether) resin suitable for blending with the polyarylethersulfone, is a linear, thermoplastic polyarylene polyether containing recurring units of the following formula:

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclar phenols can be characterized as having the structure:

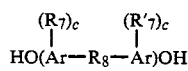

wherein Ar is an aromatic group and preferably is a phenylene group, $R_7$ and $R'_7$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_8$ is representative of a bond between aromatic carbon atoms as in dihydroxyl-diphenyl, or is a divalent radical, including for example, radicals such as

—O—, —S—, —SO—, —S—S—, —SO$_2$—, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl)alkanes such as
2,2-bis-(4-hydroxyphenyl)propane,
2,2-bis-(3,5-dimethyl-4-hydroxyphenyl)propane
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane, and the like;
  di-(hydroxyphenyl)sulfones such as
bis-(4-hydroxyphenyl)sulfone,
bis-(3,5-dimethyl-4-hydroxyphenyl)sulfone,
2,4'-dihydroxydiphenyl sulfone,
5-chloro-2,4'-dihydroxydiphenyl sulfone,
5'-chloro-4,4'-dihydroxydiphenyl sulfone, and the like;
  di(hydroxyphenyl)ethers such as
bis-(4-hydroxyphenyl)ether,
the 4,3'-, 4,2'-2,2'-2,3-,dihydroxyphenyl ethers,
4,4'-dihydroxyl-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention to supply an E' residuum, which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

Examples of benzenoid compounds which are useful in contributing E' residua to a poly(aryl ether) resin are the following:
4,4'-dichlorodiphenyl sulfone,
4,4'-difluorodiphenyl sulfone,
4,4'-bis(4-chlorophenylsulfonyl)biphenyl,
4,4'-bis(4-fluorophenylsulfonyl)biphenyl,
4,4'-difluorobenzophenone,
4,4'-dichlorobenzophenone,
4,4'-bis(4-fluorobenzoyl)benzene,
4,4'-bis(4-chlorobenzoyl)benzene,
2,6-dichlorobenzonitrile,
isomers thereof, and the like.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and heterogen, as in pyridine.

(b) divalent groups which can activate displacement of halogens on two different rings, such as the sulfone group

the carbonyl group

the vinylene group

the sulfoxide group

the azo group —N=N—; the saturated fluorocarbon groups

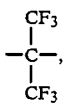

—CF$_2$—CF$_2$CF$_2$—; organic phosphine oxides

where R$_9$ is a hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Pat. No. 847,963 wherein the bisphenol and dihalobenzenoid compound are heated in the presence of potassium carbonate using a high boiling solvent such as diphenylsulfone.

Preferred polyarylene polyethers of this invention ae those prepared using the dihydric polynuclear phenols of the following four types, including the derivatives thereof which are substituted with inert substituent groups

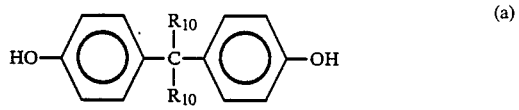

in which the R$_{10}$ groups represent independently hydrogen, lower alkyl, aryl and the halogen substituted groups thereof, which can be the same or different;

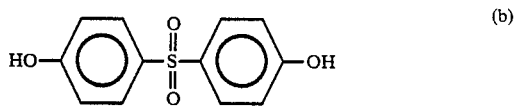

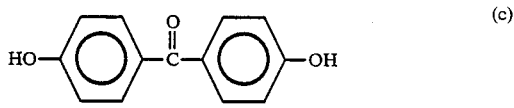

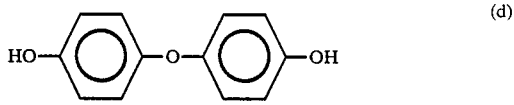

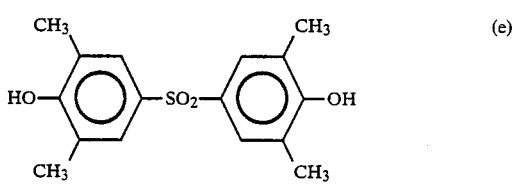

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The poly(aryl ether)s have a reduced viscosity of from about 0.35 to about 1.5 as measured in an appropriate solvent at an appropriate temperature depending on the particular polyether, such as in methylene chloride at 25° C.

The preferred poly(aryl ether)s have repeating units of the formula:

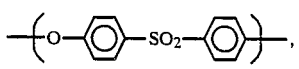

-continued

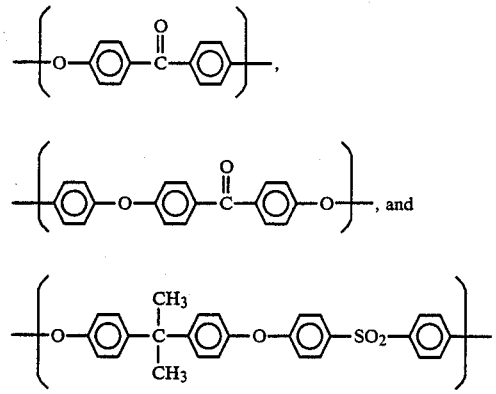

C. Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

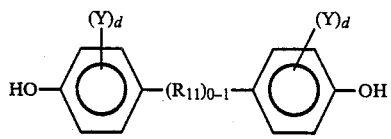

wherein Y is independently selected from, hydrogen, alkyl groups of 1 to 4 carbon atoms, chlorine or bromine, each d, independently, has a value of from 0 to 4, inclusive, and $R_{11}$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis-(4-hydroxyphenyl)propane,
2,2-bis-(3,5-dimethyl-4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and
naphthalene diols The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the ike may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

D. Polyetherimides

The polyetherimides suitable for use in this invention are well known in the art and are described in, for example, U.S. Pat. Nos. 3,847,867, 3,838,097 and 4,107,147.

The polyetherimides are of the following formula:

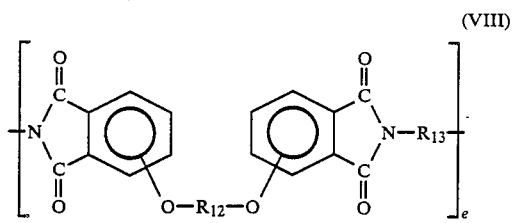
(VIII)

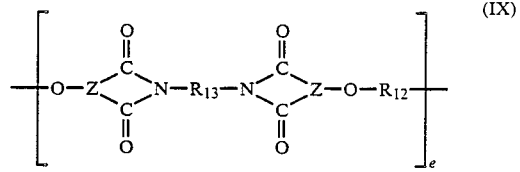
(IX)

wherein —O—Z is a member selected from

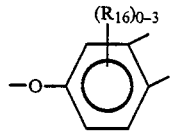

wherein $R_{16}$ is independently hydrogen, lower alkyl or lower alkoxy wherein e is an integer greater than 1, preferably from about 10 to about 10,000 or more, —O—$R_{12}$—O— is attached to the 3 or 4 and 3' or 4' positions and $R_{12}$ is selected from (a) a substituted or unsubstituted aromatic radical such as

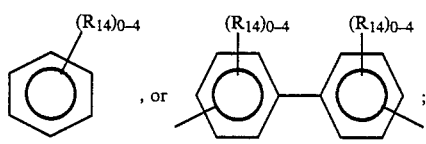

(b) a divalent radical of the formula:

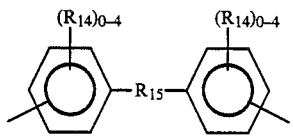

wherein $R_{14}$ is independently $C_1$ to $C_6$ alkyl, aryl or halogen and $R_{15}$ is selected from —O—, —S—,

—SO$_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon aytoms and $C_2$ to $C_8$ alkylene terminated polydiorganosiloxane or a divalent radical of the formula

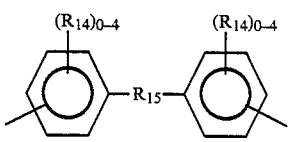

wherein $R_{14}$ and $R_{15}$ are as previously defined.

The polyetherimides may also be of the following formula:

wherein the oxygen may be attached to either ring and located ortho or para to one of the bonds of the imide carbonyl groups, $R_{12}$ and $R_{13}$ and e are as previously defined.

These polyetherimides are prepared by methods well known in the art as set forth in, for example, U.S. Pat. Nos. 3,833,544, 3,887,588, 4,017,511, 3,965,125 and 4,024,110.

The polyetherimides of Formula (VIII) can, for example, be obtained by any of the methods well-known to those skilled in the art including the reaction of any aromatic bis(ether anhydride)s of the formula

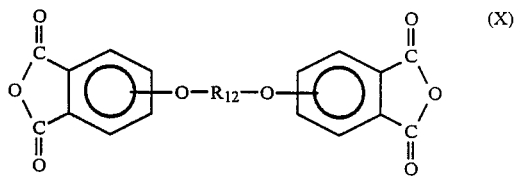
(X)

where $R_{12}$ is as defined hereinbefore, with a diamino compound of the formula $$H_2N-R_{13}-NH_2 \quad (XI)$$

where $R_{13}$ is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° to about 250° C. Alternatively, the polyetherimides can be prepared by melt polymerization of any dianhydrides of Formula (X) with any diamino compound of Formula (XI) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerizations can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides of Formula I have an intrinsic viscosity $\eta$ greater than 0.2 deciliters per gram, preferably 0.35 to 0.60, or 0.7 deciliters per gram or even higher when measured in m-cresol at 25° C.

The aromatic bis(ether anhydride)s of Formula (X) include, for example, 2,2-bis[4-(2,3-dicarboxyphenoxy)phenyl]propane dianhydride;
4,4′-bis(2,3-dicarboxyphenoxy)diphenyl ether dianhydride;
1,3-bis(2,3-dicarboxyphenoxy)benzene dianhydride;
4,4′-bis(2,3-dicarboxyphenoxy)diphenyl sulfide dianhydride;
1,4-bis(2,3-dicarboxyphenoxy)benzene dianhydride;
4,4′-bis(2,3-dicarboxyphenoxy)benzophenone dianhydride;
4,4′-bis(2,3-dicarboxyphenoxy)diphenyl sulfone dianhydride;
2,2-bis[4-(3,4-dicarboxyphenoxy)phenyl]propane dianhydride;
4,4′-bis(3,4-dicarboxyphenoxy)diphenyl ether dianhydride;
4,4′-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4′-bis(3,4-dicarboxyphenoxy)benzophenone dianhydride;
4-(2,3-dicarboxyphenoxy)-4′-(3,4-dicarboxyphenoxy)-diphenyl-2,2-propane dianhydride; etc. and mixtures of such dianhydrides.

The organic diamines of Formula (XI) include, for example, m-phenylenediamine, p-phenylenediamine, 2,2-bis(p-aminophenyl)propane, 4,4′-diaminodiphenyl-methane, 4,4′-diaminodiphenyl sulfide, 4,4′-diaminodiphenyl sulfone, 4,4′-diaminodiphenyl ether, 1,5-diaminonaphthalene, 3,3′-dimethylbenzidine, 3,3′-dimethoxybenzidine.

The polyetherimides of formula (IX) may, for example, be prepared by effecting reaction in the presence of a dipolar aprotic solvent of a mixture of ingredients comprising, for instance, (1) a bis(nitrophthalimide) of the general formula:

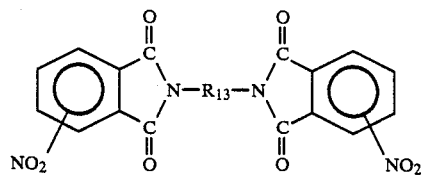

wherein $R_{13}$ is defined as hereinabove, and (2) an alkali metal salt of an organic compound of the general formula:

$$MO—R_{12}—OM \qquad (XIII)$$

wherein M is an alkali metal and $R_{12}$ is defined as hereinabove.

The bis(nitrophthalimide) used in preparing the polymer is formed by reacting a diamine of the formula described above, $NH_2—R_{13}—NH_2$, with a nitro-substituted aromatic anhydride of the formula:

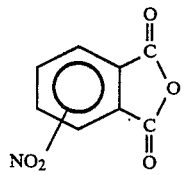

The molar ratio of diamine to anhydride should ideally about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalenedicarboxylic anhydride and 3-methoxy-6-nitrophthalic anhydride, and the like.

With reference to the alkali metal salts of formula (XIII) among the divalent carbocyclic aromatic radicals which $R_{12}$ may represent (mixtures of such radicals are also included) are, for instance, divalent aromatic hydrocarbon radicals of from 6 to 20 carbon atoms, such as phenylene, biphenylene, naphthylene, etc. Included are residues of, e.g., hydroquinone, resorcinol, chlorohydroquinone, etc. In addition $R_{12}$ may be a residue of a dihydroxyl diarylene compound in which the aryl nuclei are joined by either an aliphatic group, a sulfoxide group, sulfonyl group, sulfur, carbonyl group, oxygen, etc. Typical of such diarylene compounds are the following:

2,4-dihydroxydiphenylmethane;
bis(2-hydroxyphenyl)methane;
2,2-bis(4-hydroxyphenyl)propane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
hydroquinone;
naphthalene diols;
bis(4-hydroxyphenyl)ether;

bis(4-hydroxyphenyl)sulfide;
bis(4-hydroxyphenyl)sulfone; and the like.

When dialkali metal salts of formula (XIII) are used with the compound illustrated by formula (XII), the ingredients are advantageously present in an equal molar ratio for optimum molecular weight and properties of the polymer. Slight molar excesses, e.g., about 0.001 to 0.10 molar excess of either the dinitro-substituted organic compound or of the dialkali metal salt of formula (XIII) may be employed. When the molar ratios are approximately equal, the polymer is substantially terminated by a=Z—NO$_2$ at one end and a phenolic group at the other end. If there is a molar excess of one compound, that particular terminal group will predominate.

The conditions of reaction whereby the alkali-metal salt of formula (XIII) is reacted with the dinitro-substituted organic compound of formula (XII) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g., methanol, ethanol, isopropyl alcohol, etc.) and aliphatic hydrocarbons (e.g., pentane, hexane, octane, cyclohexane, etc.) may be employed as precipitants for this purpose.

It is important that the reaction between the dinitro-substituted organic compound of formula V and the alkali-metal salt of formula VI (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20% by weight of polymer is preferably employed.

The preferred polyetherimides include those having repeating units of the following formula:

E. Polyesters

The polyesters which are suitable for use herein are derived from an aliphatic or cyloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

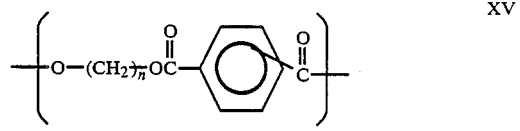

wherein n is an integer of from 2 to 10.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

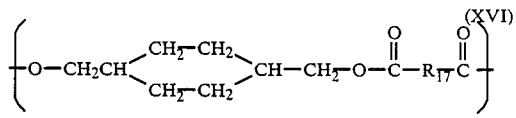

wherein the cyclohexane ring is selected from the cis- and trans-isomers thereof and R$_{17}$ represents an aryl radical containing 6 to 20 carbon atoms and which is the decarboxylated residue derived from an aromatic dicarboxylic acid.

Examples of aromatic dicarboxylic acids indicated by R$_{17}$ in formula IX, are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4- or 1,5-naphthalenedicarboxylic acids. The preferred dicarboxylic acids are terephthalic acid or a mixture of terephthalic and isophthalic acids.

A preferred polyester may be derived from the reaction of either the cis- or trans-isomer (or a mixture thereof) of 1,4-cyclohexanedimethanol with a mixture

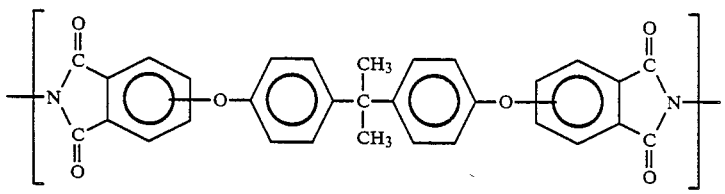

of isophthalic and terephthalic acids. These polyesters have repeating units of the formula:

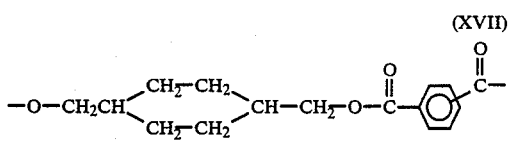

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

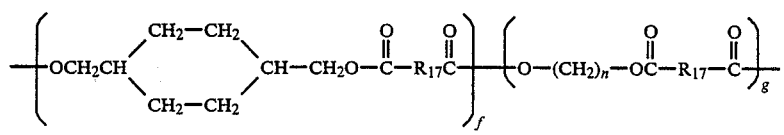

wherein the cyclohexane ring is selected from the cis- and trans-isomers thereof, $R_{17}$ is as previously defined, n is an integer of 2 to 10, the f units comprise from about 10 to about 90 percent by weight and the g units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

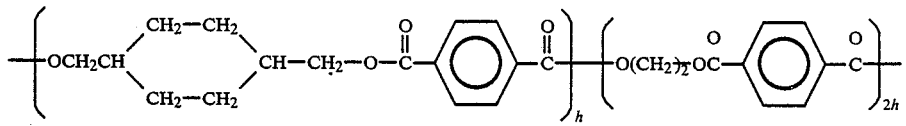

wherein h can be 10 to 10,000. Block as well as random copolymers are possible.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23° to 30° C.

F. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)-propane, 4,4-bis(4-hydroxyphenyl)heptane, 2-2-(3,5,3′,5′tetrabromo-4,4′-dihydroxydiphenyl)propane, (3,3′dichloro-4,4′dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bis-haloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyestercarbonates may be used and are included within the scope of "polycarbonate" or "polyarylate". These are described in, for example, U.S. Pat. No. 3,169,121, herein incorporated by reference. Such copolyesters comprise recurring carbonate groups

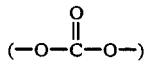

carboxylate groups

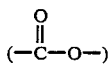

and aromatic carbocyclic groups in the linear polymer chain, in which at least some of the carboxylate groups and at least some of the carbonate groups are bonded directly to ring carbon atoms of the aromatic carbocyclic groups. The copolyesters are prepared by reacting, as essential ingredients, a difunctional carboxylic acid, a difunctional phenol, and a carbonate precursor, methods for preparing the copolyesters being well known, and disclosed in U.S. Pat. Nos. 3,030,331 and 3,169,121, among others. These copolyesters comprise at least two of the following four recurring units in their linear chain:

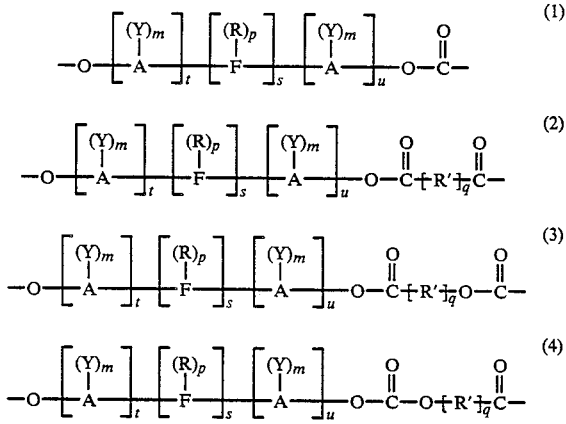

wherein

A is an aromatic group such as phenylene, biphenylene, naphthylene, anthrylene, and the like;

F may be an alkylene or alkylidene group such as methylene, ethylene, propylene, propylidene, isopropylidene, butylene, butylidene, amylene, isoamylene, amylidene, isoamylidene, and the like;

R is hydrogen, alkyl, cycloalkyl, aryl, and the like;

Y is an inorganic atom such as chlorine, bromine, or fluorine, an inorganic group such as nitro, an organic group such as R above, or any oxy group such as OR, it being only necessary that Y be inert to and unaffected by the reactants and reaction conditions;

m is any whole number from and including zero through the number of positions available on A for substitution;

p is any whole number from and including zero through the number of available positions on F;

t is a whole number equal to at least one;

s is either zero or one; and u is any whole number including zero.

Examples of dihydric phenols useful in making polyestercarbonates include all of those mentioned in connection with making polyarylether resins, supra.

The carboxylic acids useful in making polyestercarbonates include saturated, aliphatic dibasic acids derived from straight chain paraffin hydrocarbons such as oxalic, malonic, dimethyl malonic, succinic, glutaric, adipic, pimelic, suberic, azelaic, and sebacic acid, and halogen-substituted derivatives thereof;

aliphatic carboxylic acids containing hetero atoms in their aliphatic chain, such as thio-diglycollic or diglycollic acid;

unsaturated acids such as maleic or fumaric;

aromatic and aliphatic-aromatic dicarboxylic acids such as phthallic, isophthalic, terephthalic, homophthalic, o-, m-, and p-phenylene diacetic acid, and polynuclear aromatic diacids (e.g. 1,4-naphthalic);

hydroxy acids including aliphatic hydroxy acids such as hydroxybutyric, glycollic, and lactic acid, aliphatic-aromatic hydroxy acids such as mandelic and o, m, and p-hydroxybenzoic acid; and long chain fatty acid such as 12-hydroxystearic acid;

cycloaliphatic acids including tetrahydrophthalic, tetrahydroterephthalic, tetrahydroisophthalic, and the like;

A preferred polyester carbonate results from the condensation of phosgene, terephthaloyl chloride, isophthaloyl chloride with bisphenol-A and a small amount of p-tertbutylphenol.

In a preferred embodiment, the polycarbonate is a polyaromatic sulfone carbonate as described, for example, in U.S. Pat. Nos. 4,404,351 to Kafer et al., 3,737,409 to Fox, or 4,510,289 to Fox et al., and in European Patent Application No. 78100447.8 to Baron, published July 2, 1979. These polymers may be prepared by conventional processes and are obtained, generally, by reacting an aromatic diphenol and an aromatic sulphonyl diphenol together with a carbonate precursor such as phosgene. Methods of making sulfone-containing polycarbonates are well known and described in numerous patent publications in addition to those cited above. The diphenol will generally have the formula

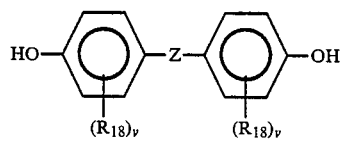

wherein

Z is a bond, $C_1$–$C_8$ alkylene, $C_2$–$C_8$ alkylidene, cyclohexylene, cyclohexylidene, S, O, or CO $R_{18}$ is hydrogen, chlorine, or alkyl substituents having 1 to 3 carbon atoms v is 0, 1 or 2

The aromatic sulfonyl diphenyl has the formula

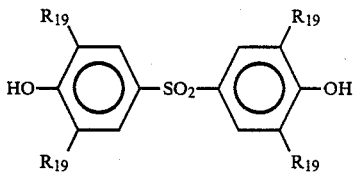

wherein $R_{19}$ is hydrogen or $C_1-C_3$ alkyl, preferably methyl.

The above phenols can be reacted with a carbonate precursor to yield a polymer of the formula

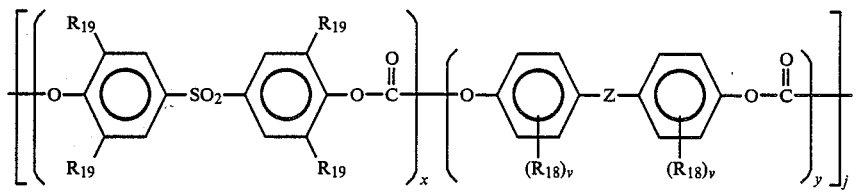

wherein $R_{18}$, $R_{19}$, Z, and v have the meanings previously given, x and y are positive numbers which vary according to the relative amounts of reactants, and j has values of usually about 5–160.

G. Styrene Resin

The styrene resins suitable for use herein include ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

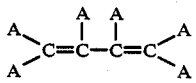

wherein A is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

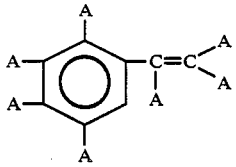

wherein A is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, α-bromostyrene, dichlorostyrene, dibromostyrene, tetra-chlorostyrene, mixtures thereof, and the like. The preferred monovinylaromatic hydrocarbons used are styrene and/or a α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The acrylonitrile, substituted acrylonitrile, or acrylic acid esters are described generically by the following formula:

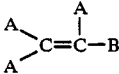

wherein A is as previously defined and B is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyreneacrylonitrile copolymer. Also, there are occasions where a copolymer, such as α-methylstyreneacrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

H. Poly(Alkyl Acrylate) Resin

The poly(alkyl acrylate) resin which may be used herein includes a homopolymer of methyl methacrylate (i.e., polymethyl methacrylate) or a copolymer of methyl methacrylate with a vinyl monomer (e.g., acrylonitrile, N-allylmaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

I. Polyhydroxyethers

The thermoplastic polyhydroxyethers which may be used herein have the following general formula:

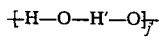

where H is the radical residuum of a dihydric phenol, H' is a radical residuum of an epoxide selected from mono- and diepoxides and which contain from 1 to 2 hydroxyl groups, and j' is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

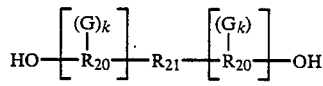

wherein the $R_{20}$'s are independently an aromatic divalent hydrocarbon radical, such as naphthylene and phenylene with phenylene being preferred, the G's may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, the k's are independently intergers of 0 to 4, $R_{21}$ is independently selected from a divalent saturated aliphatic hydrocarbon radical particularly alkylene or alkylidene radicals having from 1 to 8 carbons atoms, especially $C(CH_3)_2$, cycloalkylene, cycloalkylidene or any other divalent group such as O, S, SO, $SO_2$, CO, a chemical bond, etc. Particularly preferred are dihydric polynuclear phenols having the general formula:

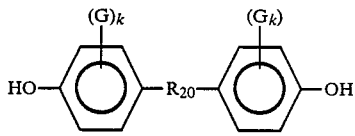

wherein G and k are as previously defined, and $R_{22}$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula:

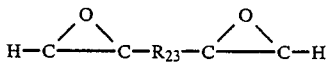

wherein $R_{23}$ is representative of a bond between adjacent carbon atoms or a divalent organic radical such as an aliphatic, aromatic, alicyclic, heterocyclic or acyclic arrangement of atoms.

Other diepoxides which can be mentioned include those wherein two oxirane groups are linked through an aromatic ether, i.e., compounds having the grouping:

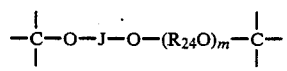

wherein $R_{24}$ is a divalent organic radical, J is a divalent aromatic radical residuum of a dihydric phenol, such as those listed above in the description of dihydric phenols, and m is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,924,747; and 2,777,051.

J. Polyamides

The polyamide polymers which may be used herein are well known in the art. The types of polyamides suitable for use in this invention include both amorphous and semicrystalline materials.

The polyamide polymers include homopolymers as well as copolymers. These polymers may be formed by conventional methods from the condensation of bifunctional monomers, by the condensation of diamines and dibasic acids, as well as by addition polymerization. Numerous combinations of diacids, such as carbonic acid, oxalic acid, glutaric acid, adipic acid, pimelic acid, suberic acid, azelaic acid, sebacic acid, dodecanedioic acid, isophthalic acid, terephthalic acid, and the like, diamines, such as hydrazine, ethylenediamine, hexamethylenediamine, 1,8-octanediamine, piperazine, and the like, and amino acids are possible. The chains between functional groups in the reactants may comprise linear or branched aliphatic hydrocarbons, or alicyclic or aromatic rings. They may also contain hetero atoms such as oxygen, sulfur, and nitrogen. Secondary diamines lead to the formation of N-substituted polyamides.

Also, included herein are the aromatic polyamide polymers which are aromatic in both the diamine and the dibasic acid. The dibasic acids include terephthalic acid, isophthalic acid, phthalic acid, and the like. The aromatic diamines include o-phenylenediamine, 2,4-diaminotoluene, 4,4'-methylenedianiline, and the like.

The polyamide polymers are prepared by methods well known in the art, such as by direct amidation which is the reaction of amine groups with carboxyls accompanied by elimination of water; low temperature polycondensation of diamines and diacid chlorides, ring-opening polymerization, addition of amines to activated double bonds, polymerization of isocyanates and reaction of formaldehyde with dinitriles.

The polyamide polymers include polyhexamethylene-adipamide, i.e., nylon 6,6; poly(ε-caprolactam), i.e., nylon-6; polypropiolactam, i.e., nylon-3; poly(pyrrolidin-2-one), i.e., nylon-4; poly(ω-enanthamide), i.e., nylon-7; polycapryllactam, i.e., nylon-8; poly(ω-pelargonamide), i.e., nylon-9; poly(11-aminodecanoic acid), i.e., nylon-10; poly(ω-undecaneamide), i.e., nylon-11; polyhexamethyleneterephthalamide, i.e., nylon-6,T, nylon 6,10, and the like

K. Poly(arylene sulfide)

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylenesulfide).

The resulting polymer contains the aromatic nucleus of the polyhalo-substituted monomer coupled in repeating units predominantly through a sulfur atom. The polymers which are preferred for use according to this invention are those polymers having the repeating unit —$R_{25}$—S— where $R_{25}$ is phenylene, biphenylene, naphthylene, or a lower alkyl-substituted derivative thereof. By lower alkyl is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where p has a value of at least about 50.

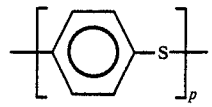

Suitable poly(phenylene sulfide) compositions are available commercially under the trade name Ryton of the Phillips Petroleum Company. Preferably, the poly(phenylene sulfide) component has a melt flow index, measured at 600° F. using a 5 Kg. weight and a standard orifice, within the range of from about 10 to about 7000 dg./min..

The term poly(arylene sulfide) is meant to include not only homopolymers but also arylene sulfide copolymers, terpolymers and the like.

Polyolefins

The melt coextrudable polyolefins which are useful in this invention include crystalline polypropylene and crystalline polyethylene of low, medium, or high density. High density polyethylene is preferred. Crystalline polypropylene is particularly preferred because of its high use temperature. Ethylene-propylene copolymers may also be employed.

Multi-layered laminates containing polyolefin layers, including those used to make various types of containers, have been well documented in the patent literature. Examples of the types of polyolefins suitable for use herein are disclosed in U.S. Pat. No. 4,497,856 to Iwasawa et al., U.S. Pat. No. 4,464,439 to Castelein, U.S. 4,440,824 to Bonis, and U.S. Pat. No. 4,430,288 to Bonis.

Polyphenylene Oxides

The polyphenylene oxides suitable for use in this invention are well known to the art and are variously described in, among other, U.S. Pat. Nos. 4,487,918, 4,446,278, 4,377,662, 4,345,050, 4,340,696, 4,334,050, 4,238,584, 4,156,772, 4,156,771, 4,154,771, and 4,140,675. Polyphenylene oxides, generally, include homopolymers, copolymers (including block copolymers) and blends having polymer components which comprise the repeat unit

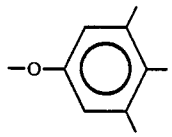

wherein the above repeat unit may be substituted with various inert groups, as discussed below.

Suitable polyphenylene oxides (PPO) are described in U.S. 4,487,918 and have the formula (XX):

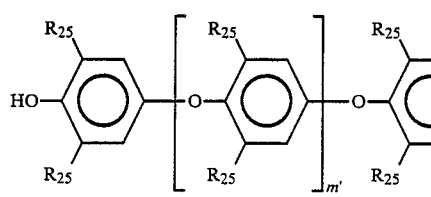

in which the groups represented by $R_{25}$ may be the same or different, and each represents a hydrogen atom or an alkyl radical containing from 1 to 4 carbon atoms, preferably hydrogen or a methyl radical, X represents a group

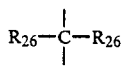

in which $R_{26}$ represents hydrogen or an alkyl radical containing from 1 to 4 carbon atoms, and m' and n' represent an integer of from 0 to 200 and preferably from 5 to 60, characterised in that polyphenylene ethers corresponding to the formula (XXI):

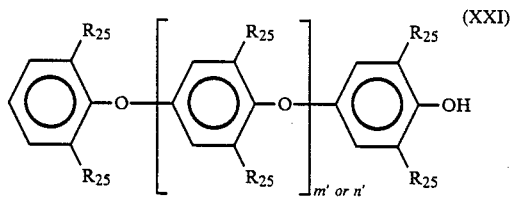

in which R, m' and n' have the same meaning as in formula (XX), are reacted with carbonyl compounds corresponding to the following formula (XXII):

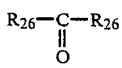

in which $R_{26}$ may be the same or different and have the same meaning as in formula (XX), in an organic solvent in the presence of a catalyst at a temperature of from −30° to 200° C. and optionally under elevated pressure.

Suitable carbonyl compounds corresponding to the general formula (XXII) are aldehydes, for example formaldehyde (for example even in its trimeric form as trioxane or as paraformaldehyde), acetaldehyde, butyraldehyde, and ketones, such as acetone or methylethyl ketone. It is preferred to use aldehydes, of which formaldehyde (preferably in the form of trioxane) is particularly preferred.

Suitable polyphenylene oxides further include "monofunctional polyphenylene oxides" well known to those skilled in the art having an average hydroxyl group per molecule value greater than zero, including 1.0 or less. These polyphenylene oxides can be prepared by any of the methods of the prior art, and may be illustrated by formula (XXIII) set out hereafter:

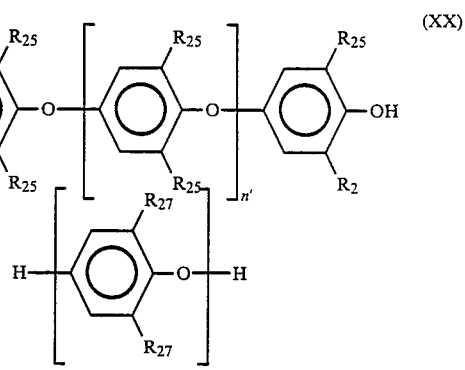

wherein independently each $R_{27}$ is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (XXIII) above wherein the hydrogen atom is disassociated from the monohydroxy group of the polyphenylene oxide, i.e., a phenoxy radical, which may be referred to as a monovalent phenoxy radical.

The expression "polyphenylene oxide" also includes "polyfunctional polyphenylene oxides" also well known to those skilled in the art including quinone-coupled polyphenylene oxides having an average hydroxyl group per molecule greater than zero, including 2.0 or less. These polyphenylene oxides can be prepared by methods described in U.S. Pat. No. 4,234,706 and can be illustrated by formula (XXIV):

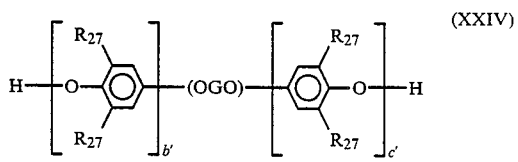

wherein independently —(OGO)— is a divalent quinone residue, G is a divalent arene radical, either b' or c' is at least equal to 1, the sum of b' plus c' is preferably at least equal to 10, more preferably 40 to 170, $R_{27}$ is the same as in formula (XXIII) above. The polyfunctional polyphenylene oxide units of the block polymers can be conceptualized by the structure of formula (XXIV)

above wherein the hydrogen atoms are disassociated from the hydroxy groups of the quinone-coupled polyphenylene oxide, i.e., a quinone-coupled polyphenoxy radical, which may be referred to as a divalent phenoxy radical.

Suitable polyphenylene oxides also include block copolymers wherein polyphenylene blocks or blocks having structures such as those given above are coupled by reacting with a particular compound. For example, formal-coupled polyphenylene oxides are described in U.S. Pat. No. 4,340,696 and are formed by the reaction of methylene halides and polyphenylene oxides. Linear, branched, and/or cross-linked acyl-coupled polymers of quinone-coupled polyphenylene oxides may be formed by contacting di- and/or tri-functional acyl halides with polyphenylene oxides having an average hydroxyl group per molecule value greater than zero including 2.0 or less, as described in U.S. Pat. No. 4,156,772. Heterocyclic-coupled linear, branched, and/or cross-linked polymers of polyphenylene oxide may be formed by contacting phosphoryl halides with (a) polyphenylene oxides having an average hydroxyl group per molecule value greater than zero including 1.0 or less or (b) quinone-coupled polyphenylene oxides having an average hydroxyl group per polymer molecule value greater than zero including 2.0 or less, including mixtures of (a) and (b), as described in U.S. Pat. No. 4,156,771. The basic quinone-coupled polyphenylene oxides for use in such processes are described, for example, in U.S. Pat. No. 4,140,675.

Suitable polyphenylene oxides additionally include block copolymers such as arene polysulfone halide coupled block polymers of polyphenylene oxide and aromatic polyformals as described in U.S. Pat. No. 4,334,050, block copolymers of polyphenylene oxides and polyformals on non-sterically hindered dihydric phenols as described in U.S. Pat. No. 4,345,050, and block copolymers of polyphenylene oxides and sterically hindered aromatic polycarbonates as described in U.S. Pat. No. 4,377,662.

Blends which include polyphenylene oxides are also useful, for example blends comprising (i) block copolymers of polyphenylene oxides and sterically-hindered aromatic polycarbonates and (ii) vinyl aromatic resins, as described in U.S. Pat. No. 4,446,278. Suitable blends are commercially available under the registered trademark NORYL ® from General Electric.

FABRICATION

Fillers, pigments, stabilizers and the like may be employed in the layer materials, although such additives should not act to increase melt viscosity significantly or otherwise render the particular layer material in which they are employed non-melt coextrudable. If a filler is employed, it is preferred that it be employed only in core layers and in an amount less than about 50 wgt. percent based on the weight of each such layer wherein it is used.

A laminate (including scrap as part of an original layer or as a discrete inside layer) may be prepared, for example, by the procedure and using an apparatus as described in U.S. Pat. No. 3,557,265. In the method of said patent, film or sheet having a plurality of layers is formed by deforming a flowing stream having layers of diverse thermoplastic material wherein the cross-sectional configuration of the plurality of flowing streams is altered by reducing the dimension of the stream in a direction generally perpendicular to the interfaces between the individual streams and by increasing the dimension of the stream in a direction generally parallel to the interface to provide a sheet having a laminar structure.

For different laminate systems, the particular coextrusion die employed can facilitate the coextrusion. For example, in a preferred embodiment the inventors have determined that a Cloeren die (available from the Cloeren Die Co., Orange, Tex.) may advantageously be used to reinsert scrap into a polyarylethersulfone/polyethylene terephthalate/polyarylethersulfone laminate from which it was generated.

The laminates are generally from about 15 to about 40 mils thick, preferably about 30 mils thick. The inner layers generally total from about 3 to about 15 mils in thickness.

The laminate is thermoformed into the shape of a desired article. Thermoforming may be accomplished by methods well known in the art such as those described in, for example, Engineering Polymer Science and Technology, Volume 13, 1971, pages 832-843. Generally, the laminate is vacuum formed into a female mold. In this process, the laminate is locked in a frame around its periphery only, is heated to a predetermined temperature for a predetermined time and then brought into contact with the edge of the mold. This contact creates a seal so that it is possible to remove the air between the hot laminate and the mold, allowing atmospheric pressure to force the hot laminate against the mold. Also, the laminate may be draped manually to the required contour of a female mold, such as to make a seal possible. Positive air pressure may also be applied against the top of the laminate to force it into a female mold as an alternative to vacuum forming.

To promote uniformity of distribution in articles of manufacture (such as cookware) having particular shapes such as a box shape, a plug assist may be used. This may be any type of mechanical helper which carries extra material toward an area which would otherwise be too thin. Usually the plug is made of metal, and heated to a temperature slightly below that of the hot plastic, so as not to cool the laminate before it can reach its final shape. Instead of metal, a smooth grained wood can be used or a thermoset plastic, such as phenolic or epoxy. These materials are poor conductors of heat and hence do not withdraw much heat from the sheet. Plug assists are adaptable both to vacuum forming and pressure forming techniques.

Another method which can be used to thermoform the laminate is matched mold forming. In this method, the laminate is locked into a clamping frame and heated to the proper forming temperature. A male mold is positioned on the top or bottom platen with a matched female mold mounted on the other platen. The mold is then closed, forcing the laminate to the contours of both molds. The clearance between the male and female molds determines the wall thickness. Trapped air is allowed to escape through both mold faces. Molds are held in place until the laminate cools.

In a useful embodiment, the laminate is locked into a frame around its periphery only. The laminate is then heated in an oven to a temperature above the glass transition of the polymer(s) in the laminate for about 15 to about 20 seconds so that the laminate sags under its own weight. The laminate is then brought into contact with the edge of a female mold so as to create a seal between the hot plastic and the mold. The female mold is positioned in the top platen. A vacuum is then started so that the laminate is pulled into the confines of the female mold. The mold temperature is generally from about 240° to about 380° F. The material is allowed to remain in the mold for about 30 seconds so that it cools from its initial temperature to the mold temperature which is usually from about 240° to about 380° F. The formed laminate at this point is rigid and can be removed from the mold. The preferred molding procedure results in a better distribution of thickness of material in the molded article. Also, the molded articles is generally free of pin holes when this procedure, is used. In a variation of the preferred procedure, the laminate is forced into the female mold with a plug assist. The plug is so positioned that it carries the laminate into the female mold but does not touch any part of the mold. The vacuum is then turned on so that the laminate forms to the contours of the female mold. The formed laminate is allowed to cool as described above and then removed from the mold.

COOKWARE

As previously noted, it is particularly contemplated to fabricate cookware articles from the improved laminates of this invention. The cookware may be any type of container or tray which is used to heat or cook food. The cookware may be of any shape or design with dimensions dependent upon the desired end use. Representative cookware is found in, for example, U.S. Pat. Nos. 3,938,730; 3,743,077 and 3,955,170. Also, representative designs of cookware are described in, for example, Des. 236,574; 194,277 and 236,182. The cookware may be used to heat and bake all types of food, including frozen food in a conventional or microwave oven.

The invention is further disclosed and described by means of the following example.

EXAMPLE 1

A laminate of the ABA type having a thickness of 24 mils was produced by melt coextruding a laminate having outer layers of a poly(aryl ether sulfone) obtainable under the registered trademark RADEL ® from Union Carbide Corporation and an inner layer of a bisphenol-A polycarbonate obtainable under the registered trademark MERLON ® HMS3118 from Mobay Chemical. The ABA laminate layers were coextruded in thickness percentages of 12.5%/75%/12.5%. The co-extrusion apparatus consisted of a 3½ inch, 30:1 L/D Prodex main extruder and a 2½ inch, 30:1 L/D Prodex auxiliary extruder. The operating conditions were as follows:

| EXTRUDER RUN CONDITIONS | | | |
|---|---|---|---|
| | | main | co-ext. |
| POLISHING ROLL SPEED | FPM | 19 = (1.7) | |
| POWER UNIT SPEED | % | Die Lip = 25 mil | |
| RUBBR ROLL SPEED | FPM | 16 = (3.30) (measured) | |
| TOP ROLL TEMPERATURE | DEG. F | set act 300 302 | 298 |
| CENTER ROLL TEMPERATURE | DEG. F | 370 347 | 362 |
| BOTTOM ROLL TEMPERATURE | DEG. F | 360 360 | 357 |
| HEAD PRESSURE | POUNDS | 1795 | 2075 |
| ADAPTER PRESSURE | POUNDS | 205 | 1950 |
| DIE ZONE TEMP. | | | |
| ZONE #1 | DEG. F | 675 | |
| ZONE #2 | DEG. F | 675 | |

| -continued | | | |
|---|---|---|---|
| EXTRUDER RUN CONDITIONS | | | |
| | | main | co-ext. |
| ZONE #3 | DEG. F | 675 | |
| SCREEN CHANGER TEMPERATURE | DEG. F | 550 | 675 |
| BREAKER PLATE TEMPERATURE | | | |
| ZONE #1 | DEG. F | 20-60-40-20 | 675 |
| ZONE #2 | DEG. F | 550 | 20 mesh |
| BARREL ZONE TEMPERATURE | | | |
| ZONE #1 | DEG. F | 525 | 640 |
| ZONE #2 | DEG. F | 540 | 660 |
| ZONE #3 | DEG. F | 550 | 675 |
| ZONE #4 | DEG. F | 550 | 700 |
| ZONE #5 | DEG. F | 550 | adapter 675 |
| MELT TEMPERATURE | DEG. F | 559 | 703 |
| SCREW SPEED | RPM | 25 | 44 = (3.23) |
| SCREW AMPERAGE | AMPS | 186 | 65 |
| DRYER TEMPERATURE | DEG. F | 230°—6 hr. | 275°—6 hr. |
| DEW POINT - SATISFACTORY (X) | X | Then 260° start-up | Then 325° start-up |

Polycarbonate pellets were placed in the main extrusion hopper while the poly(aryl ether sulfone) was placed in the auxiliary coextrusion unit. High quality sheet suitable for the formation of frozen food packages was produced and packages thermoformed therefrom were of commercial quality.

To produce sheet and packages of even higher quality (i.e., higher glass transition temperature), scrap from both the original coextrusion and the thermoforming is added to the main extruder in place of an equivalent volume of the polycarbonate. Since the scrap consists of high $T_g$, high flexural modulus poly(aryl ether sulfone) and lower $T_g$, lower flexural modulus polycarbonate, its average $T_g$ is higher than polycarbonate alone, and the sheet and packages produced have a higher overall $T_g$ and flexural modulus at use temperature than the original laminate. Since the scrap has a lower value (if any) than the polycarbonate, the packages and sheet made with scrap is less expensive than the original laminate.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A continuous plastic laminate comprising at least three melt coextruded sheets, each sheet comprising at least one thermoplastic polymer, the outside sheets having a higher stiffness at use temperature than at least one inside sheet, said inside sheet comprising laminate scrap derived from the production of said laminate comprising a blend of a thermoplastic polymer A and thermoplastic polymer B, thermoplastic polymer A having a higher glass transition temperature than thermoplastic polymer B and said outside sheets comprising thermoplastic polymer A, wherein said thermoplastic polymers are selected from the group consisting of one or more of the following: a polyrylethersulfone, a poly(aryl ether), a polyarylate, a polyetherimide, a polyester, an aromatic polycarbonate, a styrene resin, a poly(alkyl acrylate), a polyhydroxyether, a polyamide, a poly(arylene sulfide), a crystalline polyolefin, and a polyphenylene oxide; said laminate comprising the following:

A/ABA/B/A,

A/B/ABA/A,

A/ABA/B/ABA/A,

AABA/B/A,

A/B/AABA,

AABA/B/AABA,

A/ABAB/A,

AABA/ABAB/A,

A/ABAB/AABA, or

AABA/ABAB/AABA.

2. A continuous plastic laminate as defined in claim 1, wherein at least one layer of said laminate comprises a polyphenylene oxide having the formula:

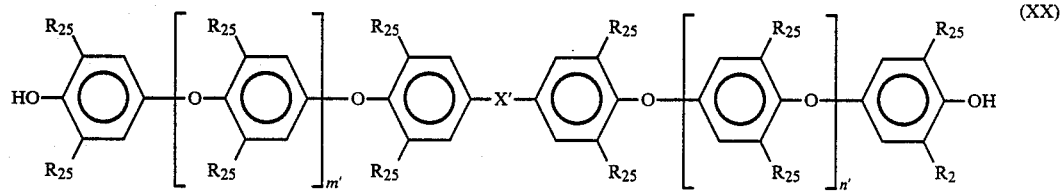

wherein
the groups represented by $R_{25}$ may be the same or different and each represents a hydrogen atom or an alkyl radical containing from 1 to 4 carbon atoms,
X represents a group

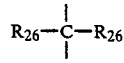

in which $R_{26}$ represents hydrogen or an alkyl radical containing from 1 to 4 carbon atoms, and
m and n represent an integer from 0 to 200.

3. A continuous plastic laminate, as defined in claim 1, which is suitable for use at a temperature between about 350° and about 450° F.

4. A continuous plastic laminate, as defined in claim 1, wherein at least two of the thermoplastic polymers comprising the sheets therein are melt incompatible.

5. A continuous plastic laminate, as defined in claim 1, wherein said laminate scrap is incorporated therein as at least one additional discrete inside sheet contiguous with at least one of said two outside sheets.

6. A continuous plastic laminate, as defined in claim 5, wherein said scrap is incorporated as two additional discrete inside sheets, each contiguous with an outside sheet.

7. A continuous plastic laminate, as defined in claim 1, wherein said scrap replaces a substantially equal volume of thermoplastic material from at least one inside sheet having a lower use temperature than said outside sheets.

8. A continuous plastic laminate, as defined in claim 1, wherein wherein at least one layer of said laminate comprises a polyarylethersulfone containing units of the following formula:

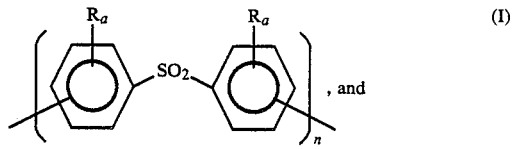

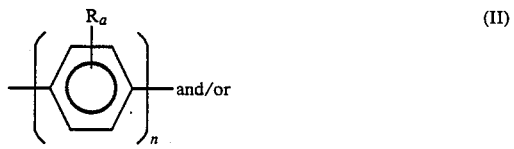

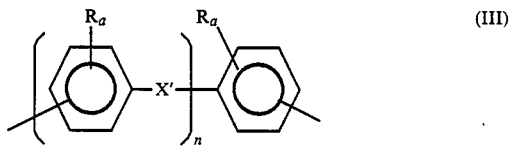

wherein R is independently hydrogen, $C_1$ to $C_6$ alkyl or $C_4$ to $C_8$ cycloalkyl, X' is independently

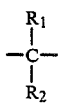

wherein $R_1$ and $R_2$ are independently hydrogen or $C_1$ to $C_9$ alkyl, or

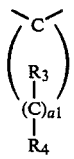

wherein $R_3$ and $R_4$ are independently hydrogen or $C_1$ to $C_8$ alkyl, —S—, —O—, or

a is an integer of 0 to 4, a' is an integer of 3 to 8, and n is independently an integer of 1 to 3 and wherein the ratio of unit (I) to the sum of units (II) and/or (III) is greater than 1, wherein the units are attached to each other by an —O— bond.

9. A continuous plastic laminate as defined in claim 8, wherein said polyarylethersulfone contains recurring units of the formula:

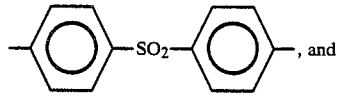, and

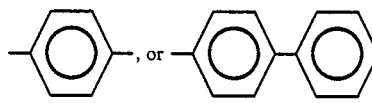

said units being attached to each other an —O— bond.

10. A continuous plastic laminate as defined in claim 8, wherein said polyarylethersulfone contains recurring units of the formula:

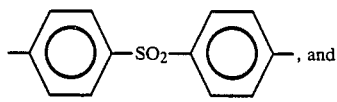, and (I)

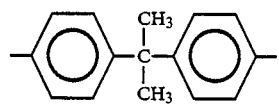 (II)

11. A continuous plastic laminate as defined in claim 1, wherein at least one layer of said laminate comprises a poly(arylether) containing recurring units of the following formula:

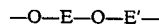

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms.

12. A continuous plastic laminate as defined in claim 11, wherein said poly (aryl ether) contains units of the following formula:

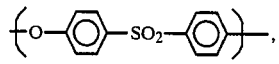,

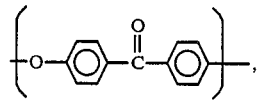,

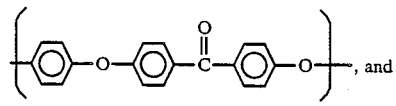, and

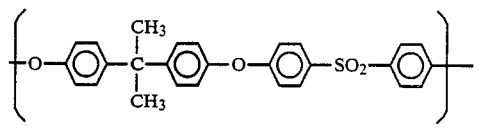

13. A continuous plastic laminate as defined in claim 1, wherein at least one layer of said laminate comprises a polyarylate derived from a dihydric phenol and at least one aromatic dicarboxylic acid.

14. A continuous plastic laminate as defined in claim 13, wherein the polyarylate is derived from bisphenol A and terephthalic acid or isophthalic acid, or mixtures thereof.

15. A continuous plastic laminate as defined in claim 1, wherein at least one layer of said laminate comprises a polyetherimide polymer of the following formula:

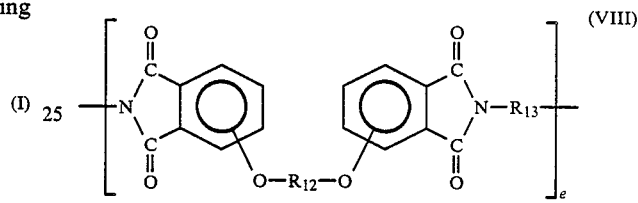 (VIII)

wherein e is an integer greater than 1, preferably from about 10 to about 10,000 or more, —O—$R_{12}$—O— is attached to the 3 or 4 and 3' or 4' positions and $R_{12}$ is selected from the group consisting of (a) a substituted or unsubstituted aromatic radical such as

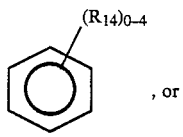, or

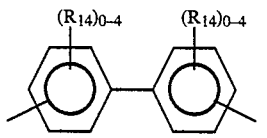;

(b) a divalent radical of the formula:

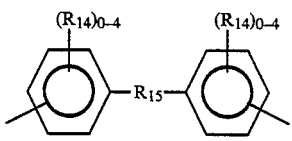

wherein $R_{14}$ is independently $C_1$ to $C_6$ alkyl, aryl, or halogen and $R_{15}$ is selected from —O—, —S—, —C—, —$SO_2$—, —SO—, alkylene of 1 to 6 carbon atoms, cycloalkylene of 4 to 8 carbon atoms, alkylidene of 1 to 6 carbon atoms or cycloalkylidene of 4 to 8 carbon atoms, $R_{13}$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and $C_2$ to $C_8$ alkylene terminated polydiorganosiloxane or a divalent radical of the formula:

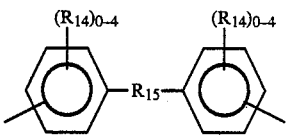

wherein $R_{14}$ and $R_{15}$ are as previously defined.

16. A continuous plastic laminate as defined in claim 1, wherein at least one layer of said laminate comprises a polyether imide of the following formula:

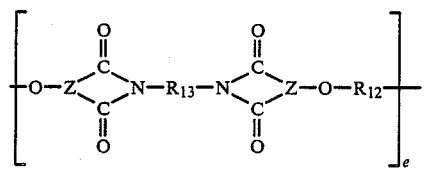 (IX)

wherein —O—Z is a member selected from the group consisting of

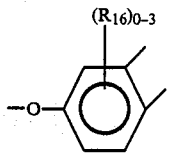

wherein $R_{16}$ is independently hydrogen, lower alkyl or lower alkoxy

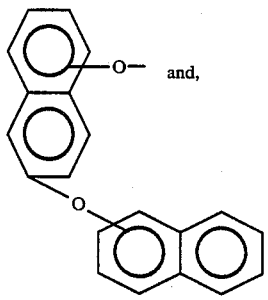 and, wherein the oxygen may be attached to either ring and located ortho or para to one of the bonds of the imide carbonyl groups, $R_{12}$ and $R_{13}$ and e are as defined in claim 15.

17. A continuous plastic laminate, as defined in claim 1, wherein at least one layer of said laminate comprises a polyetherimide having repeating units of the following formula:

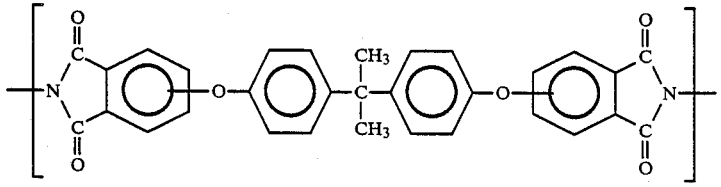

18. A continuous plastic laminate as defined in claim 1, wherein at least one layer of said laminate comprises a polyester having repeating units of the general formula:

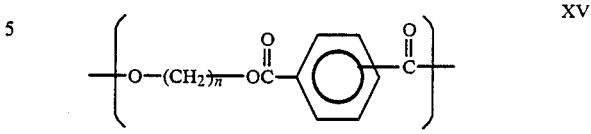 XV wherein n is an integer of from 2 to 10.

19. A continuous plastic laminate as defined in claim 1, wherein at least one layer of said laminate comprises a polyester which is poly(ethylene terephthalate).

20. A continuous plastic laminate as defined in claim 1, wherein at least one layer of said laminate comprises an aromatic polycarbonate which is the reaction product of a dihydric phenol and a carbonate precursor.

21. A continuous plastic laminate as defined in claim 20, wherein said dihydric phenol is bisphenol A and the carbonate precursor is carbonyl chloride.

22. A continuous plastic laminate as defined in claim 1, wherein at least one layer of said laminate comprises a polycarbonated which is a poly(ester carbonate).

23. A continuous plastic laminate as defined in claim 1, wherein at least one layer of said laminate comprises a polycarbonate which is a polyaromatic sulfone carbonate.

24. A continuous plastic laminate as defined in claim 1, wherein at least one layer of said laminate comprises a styrene resin prepared by polymerizing a conjugated diene monomer, or a conjugated diene monomer and monomer copolymerizable therewith, or an acrylic acid ester, to provide an elastomeric backbone, and thereafter grafting at least one grafting monomer onto said backbone.

25. A continuous plastic laminate as defined in claim 1, wherein at least one layer of said laminate comprises a styrene resin which is a butadiene/styrene/acrylonitrile resin.

26. A continuous plastic laminate as defined in claim 1, wherein at least one layer of said laminate comprises a poly(alkyl acrylate) which is poly(methyl methacrylate).

27. A continuous plastic laminate as defined in claim 1, wherein at least one layer of said laminate comprises a polyhydroxyether having the following general formula:

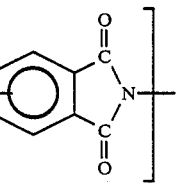

where H is the radical, residuum of a dihydric phenol, H' is a radical residuum of an epoxide selected from mono- and diepoxides and which contain from 1 to 2 hydroxyl groups, and j' is an integer which represents the degree of polymerization and is at least 30.

28. A continuous plastic laminate as defined in claim 1, wherein at least one layer of said laminate comprises a polyamide selected from the group consisting of nylon 6,6, nylon 6, or nylon 6,10.

29. A continuous plastic laminate as defined in claim 1, wherein at least one layer of said laminate comprises a poly(arylene sulfide) of the following formula:

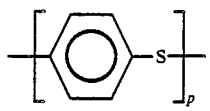

wherein p has a value of at least about 50.

30. A continuous plastic laminate as defined in claim 1, wherein at least one layer of said laminate comprises polyolefin selected from the group consisting of crystalline polyethylene, crystalline polypropylene, and ethylene-propylene copolymers.

31. A continuous plastic laminate as defined in claim 1, wherein at least one layer of said lamiate comprises a polyphenylene oxide which is a monofunctional polyphenylene oxide having an average hydroxyl group per molecule value greater than zero.

32. A continuous plastic laminate as defined in claim 1, wherein at least one layer of said laminate comprises a polyphenylene oxide which is a block copolymer containing polyphenylene oxide blocks which are coupled.

33. A continuous plastic laminate as defined in claim 1, wherein at least one layer of said laminate comprises a polyphenylene oxide blend.

34. A laminate as defined in claim 1, in the form of cookware.

35. A laminate as defined in claim 1, in the form of a container for hot food.

36. A laminate as defined in claim 1, in the form of a sterilizable container.

37. A continuous plastic laminate, as defined in claim 1, wherein thermoplastic polymer A is a polyetherimide.

38. A continuous plastic laminate, as defined in claim 1, wherein thermoplastic polymer B is a poly(ester carbonate).

39. A continuous plastic laminate, as defined in claim 1, which comprises five melt coextruded sheets.

* * * * *

UNITED STATES PATENT AND TRADEMARK OFFICE
CERTIFICATE OF CORRECTION

PATENT NO. : 4,877,682

DATED : October 31, 1989

INVENTOR(S) : Sauers et al

It is certified that error appears in the above-identified patent and that said Letters Patent is hereby corrected as shown below:

Column   Line abstract  6    "continuous laminate scrap" should read --continuous laminate contains laminate scrap-- abstract  19   "poly(alkyl)" should read --poly(alkyl acrylate)--

6         1    "75 wg. %" should read --75 wgt. %--

8         3-8  " 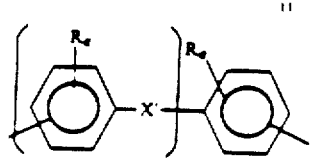 " should read --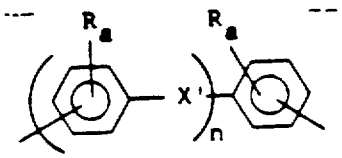--

8         22-28 " 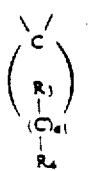 " should be --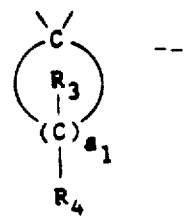--

UNITED STATES PATENT AND TRADEMARK OFFICE
CERTIFICATE OF CORRECTION

PATENT NO. : 4,877,682

DATED : October 31, 1989

INVENTOR(S) : Sauers et al

Page 2 of 2

It is certified that error appears in the above-identified patent and that said Letters Patent is hereby corrected as shown below:

| Column | Line |
|---|---|
| 9 | 53-68 |

" 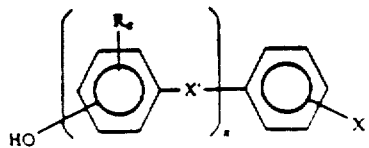 " should read -- 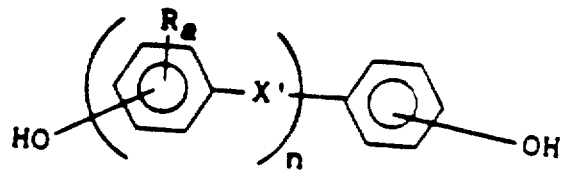 --

" 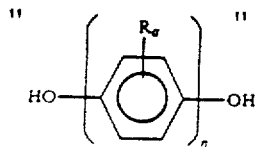 " should read -- 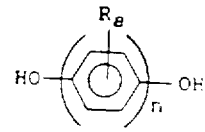 --

| | | |
|---|---|---|
| 28 | 68 | "diphenyl" should read --diphenol-- |
| 36 | | At line 15 Formula XXIII should be moved to Line 30 opposite the structure. |

Signed and Sealed this

Ninth Day of July, 1991

Attest:

HARRY F. MANBECK, JR.

Attesting Officer

Commissioner of Patents and Trademarks